April 20, 1965 J. R. CAULFIELD 3,179,405
DOUBLE DECK SHEET DELIVERY APPARATUS
Filed Dec. 3, 1962 6 Sheets-Sheet 1

INVENTOR.
JOSEPH R. CAULFIELD
BY
ATTORNEYS

FIG. 2B

INVENTOR.
JOSEPH R. CAULFIELD
BY James and Franklin
ATTORNEYS

April 20, 1965  J. R. CAULFIELD  3,179,405
DOUBLE DECK SHEET DELIVERY APPARATUS
Filed Dec. 3, 1962  6 Sheets-Sheet 3

INVENTOR.
JOSEPH R. CAULFIELD
BY James and Franklin
ATTORNEYS

April 20, 1965  J. R. CAULFIELD  3,179,405
DOUBLE DECK SHEET DELIVERY APPARATUS
Filed Dec. 3, 1962  6 Sheets-Sheet 6

INVENTOR.
JOSEPH R. CAULFIELD
BY
ATTORNEYS

United States Patent Office 3,179,405
Patented Apr. 20, 1965

3,179,405
DOUBLE DECK SHEET DELIVERY APPARATUS
Joseph R. Caulfield, Norwood, N.J., assignor to Champlain Company, Inc., Roseland, N.J., a corporation of New York
Filed Dec. 3, 1962, Ser. No. 241,591
6 Claims. (Cl. 271—64)

This invention relates to apparatus for receiving and stacking sheets, commonly called delivery apparatus, and more particularly to apparatus for handling blanks being separated from a continuous high speed web.

An important example arises in the manufacture of carton blanks. The web runs through a printing press which may consist of a series of printing units, and then to a cutter creaser, this being a punch and die mechanism for shaping and appropriately scoring or creasing the blanks for subsequent folding. The cutter creaser is followed by a stripper which has appropriately positioned pins to spear and remove pieces of scrap. At this time the blanks are still connected end to end, but only by small easily broken tabs. Immediately following the stripper the blanks reach a tab breaker which propels each blank faster than the web, thereby breaking it free at the tabs. The usual delivery apparatus comprises slow speed belts with shingling wheels resting thereon, the blanks being held in overlapping relation by the shingling wheels, and the shingled blanks then moving on the belts to a table at the end of the belts. The blanks are stacked on the table.

With increase in delivery speed difficulties have arisen. Box blanks are not plain flat sheets, but have a complicated shape, and some parts may bend somewhat relative to the sheet. These may catch during shingling, unless a first blank has had ample time to drop down flat on the slow belts before a second blank is slid over it. At high speed there is also danger of a second blank even coming beneath a first blank which has not yet settled down. There is also disarray of the blanks.

The primary object of the present invention is to overcome this difficulty, and to provide an improved delivery apparatus capable of handling blanks received at high speed. For this purpose I provide upper and lower decks, with an oscillatable deflector immediately following the tab breaker, the said deflector feeding alternate blanks to one deck, and the intermediate blanks to the other. This doubles the time available for shingling the blanks on each deck.

In accordance with a further feature and object of the invention, power driven slow-down rollers are provided on each deck. These slow each blank before delivering the same to the shingling wheels and slow belts. The slow-down rollers are designed to handle one blank at a time. They could not be used at high speed on a single deck because the blanks would pile up at the rollers, but with two decks there is time for them to function on one deck while the next blank is on the other deck.

It is also imortant to insure that the trailing end of a blank has left and is already free of the high speed drive of the tab breaker rolls, by the time the leading edge of the blank reaches the slow-down rollers, and accordingly, a further object is to facilitate adjustment of the position of the slow-down rollers toward or away from the deflector. Another object is to guide a blank safely from the deflector to the slow-down rollers, and for this purpose each deck is provided with an apron connected to and movable with the rollers, the excess length at the other end of the apron being wound on a roller.

Another object is to effect adjustment of the angle of delivery from the slow-down rollers to the shingling wheels. A still further object is to provide a drive for the slow-down rollers which is not affected by adjustment of the rollers toward or away from the deflector. The said adjustment is made in a sloping direction, for reasons explained later.

Another object of the invention is to insure that a blank leaves the positive feed of the slow-down rollers before encountering the shingling wheels. For this purpose the shingling wheels are on a carriage which is movably mounted, and provided with gear and rack mechanism for adjustment of the shingling wheel carriage along the deck toward or away from the slow-down rollers.

Still further objects of the invention are to make possible angular adjustment of the decks; to make adjustment of one deck independent of the other; to make these adjustments independent of the drive means for the slow belts; and to make such adjustments without changing the relation of the stacking tables to the slow belts.

The delivery apparatus as so far described is capable of handling blanks which differ in length over a substantial range. Another object is to adapt the same apparatus to handle much longer blanks, though not as a double deck delivery. Considered in different aspect, it is an object to make the apparatus usable as a single deck delivery for extra long blanks, and yet to take advantage of the presence of the two decks. For this purpose the long blanks are first shingled on the upper deck and then delivered to the slow belts of the lower deck, which may be operated at still slower speed, resulting in closer shingling before the blanks are stacked on the table of the lower deck.

To accomplish the foregoing objects, and other more specific objects which will hereinafter appear, my invention resides in the delivery apparatus and the elements thereof and their relation one to another, as are hereinafter more particularly described in the following specification. The specification is accompanied by drawings in which:

FIG. 1 is a perspective view showing a delivery apparatus embodying features of the present invention;

FIGS. 2-A and 2-B, when juxtaposed end to end, constitute a side elevation of the delivery apparatus;

Figures 1, 2A:
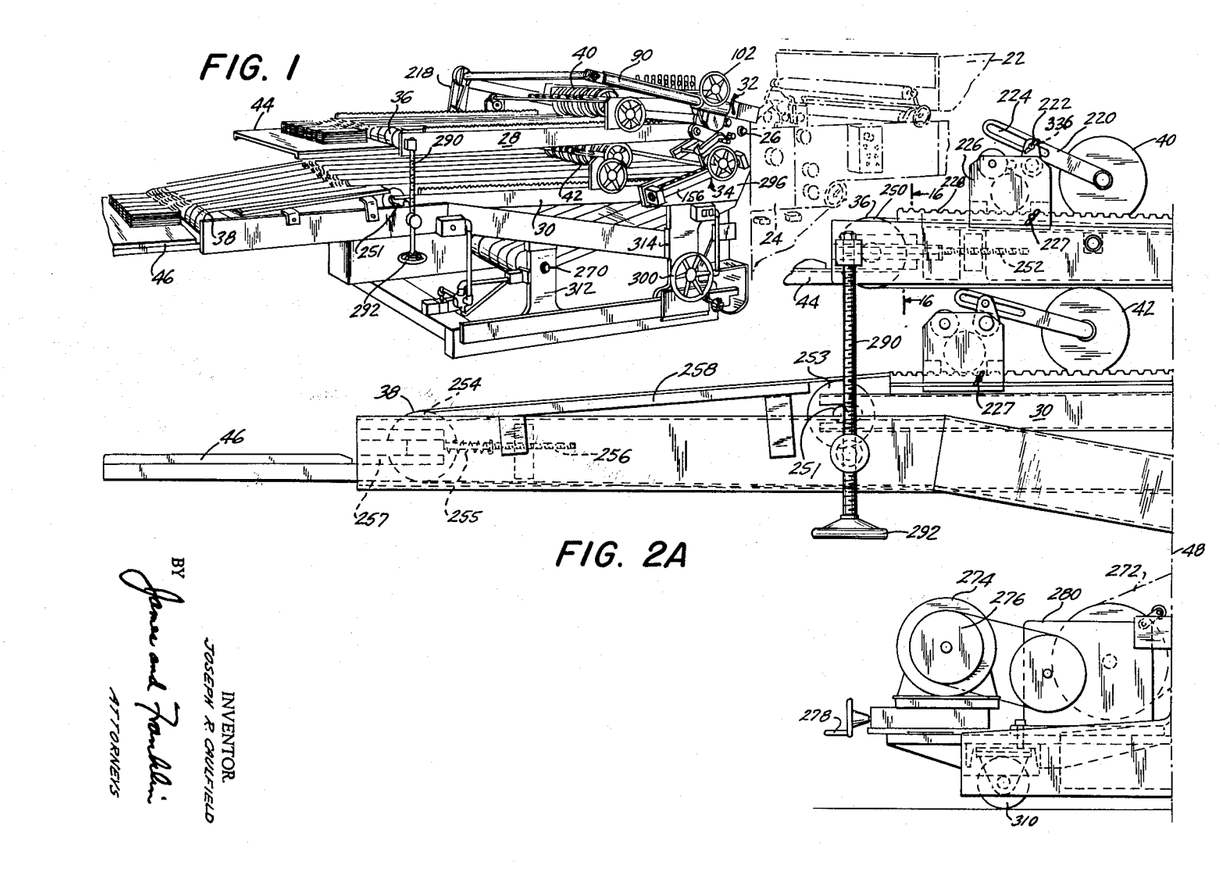

Referring to the drawing, and more particularly to FIG. 1, the delivery apparatus follows a cutter creaser, the top platen of which is fragmentarily indicated in broken lines at 22, which is followed by a stripper indicated at 24, and by breaker rolls located immediately after the stripper with one shaft indicated at 26. A deflector deflects alternate blanks to an upper deck 28, and the intermediate blanks to a lower deck 30. The decks have power driven slow-down rollers located generally at 32 and 34. There are also slow belts extending along the decks, the ends of these belts being shown at 36 and 38. There are shingling rollers 40 and 42 over the slow belts. The shingled blanks are delivered to tables 44 and 46 at the ends of the decks. The lower deck and its slow belts are preferably made longer than the upper deck, so that table 46 is displaced from table 44.

Figure 2B:
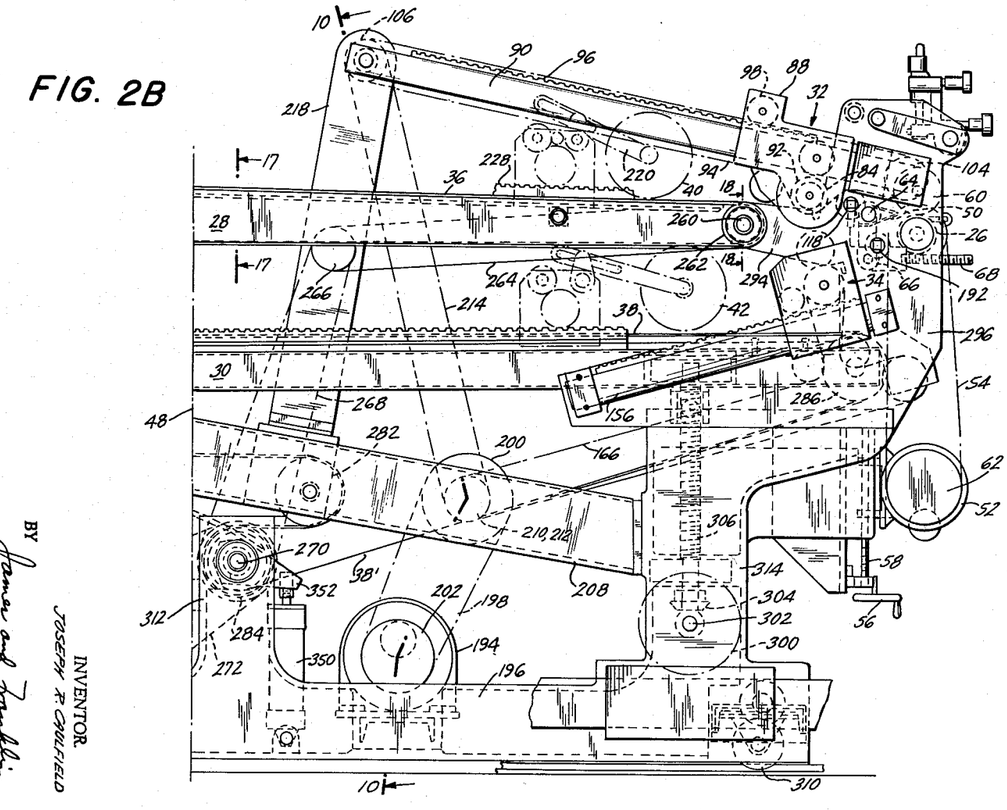

The apparatus is shown in elevation by combining FIGS. 2–A and 2–B edge-to-edge on the broken line 48. The tab breaker rolls 26, 60 are followed by a deflector 50 which deflects a blank to either the upper slow-down rollers 32, or downward to the lower slow-down rollers 34. These deliver the slowed blanks to the slow belts 36 and 38, and to the shingling wheels 40 and 42. The latter are shown in broken lines in FIG. 2–B in a far position toward the right, and they are shown in solid lines in FIG. 2–A in a far position toward the left. The position of the shingling wheel carriage along the deck depends on the length of the blanks, as is explained later. FIG. 2–A also shows the delivery table 46 beyond the belts 38 of the lower deck, and a fragment of the upper table 44 beyond the belts 36 of the upper deck.

*Tab breaker and deflector*

Referring to FIG. 2–B, a motor with appropriate gears, indicated at 52, drives the lower tab breaker roll 26 through a belt 54, the position of the motor being vertically adjustable by means of a crank 56 and a screw 58. The upper roller 60 is frictionally driven. The lower drive pulley 62 is preferably designed for speed adjustment, it being a Reeves or equivalent pulley, and the motor being raised or lowered, depending on the speed adjustment desired. The belt 54 then is a V-belt.

The deflector 50 is carried and may be oscillated by a shaft 64 having an arm 66 connected to a link 68.

Figures 7, 8, 9:
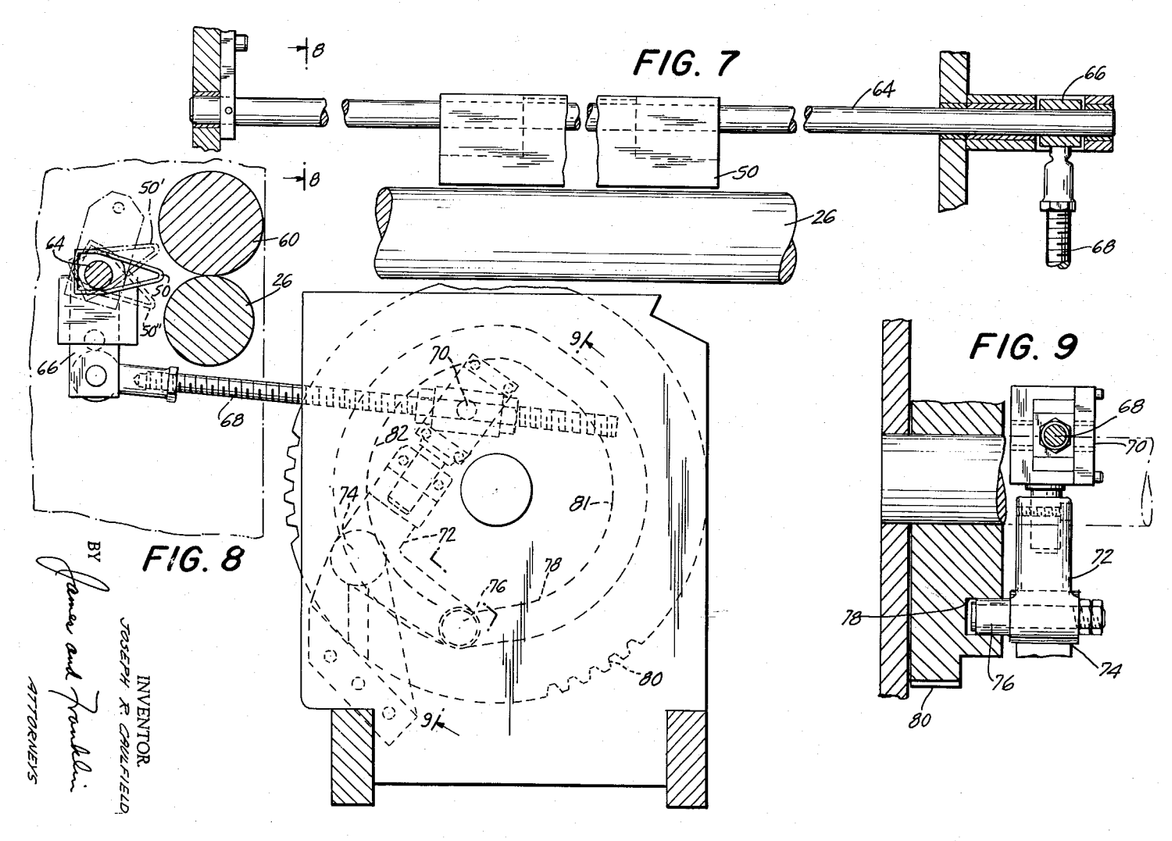
FIG. 7 is a fragmentary horizontal section showing the deflector which guides blanks to the upper or lower deck.
FIG. 8 is a vertical section taken approximately at the line 8—8 of FIG. 7, and shows the mechanism for operating the deflector.
FIG. 9 is a view taken approximately in the plane of the line 9—9 of FIG. 8, and again shows the operating mechanism for the deflector.

Referring now to FIGS. 7, 8 and 9 of the drawing, deflector 50 follows tab breaker rolls 60 and 26, and is carried by spindle 64 having an arm 66, the lower end of which is pivotally connected to link 68. The other end of link 68 is pivoted at 70 to an angle 72 which is pivoted at 74. The other arm of the angle lever has a cam follower roller 76 which runs in a cam groove 78 formed on the outer face of a cam which turns with a main gear 80 for the stripper drum. Gear 80 turns in one-for-two ratio with the blanks, and in the present case it is convenient to use the shaft and gear of the regular stripper drum (previously mentioned as located generally at 24 in FIG. 1). The stripper in the present case has pins around a large drum, the circumference of which is long enough for two of the longest blanks. The pins spear and remove the pieces of scrap. The particular machine shown handles blanks up to eighteen inches long on both decks. The stripper drum has a circumference greater than thirty-six inches and is appropriately geared to the cutter creaser press.

From inspection of FIG. 8 it will be seen that the cam groove has a small radius portion 81 for about half its length, and a large radius portion 82 for the other half, with sloping transition parts therebetween. The deflector 50 therefore remains in the raised position 50' during the passage of one blank, and in the lowered position 50" during the passage of the next blank, and so on.

*Slow-down rollers*

Figures 3, 4, 5:
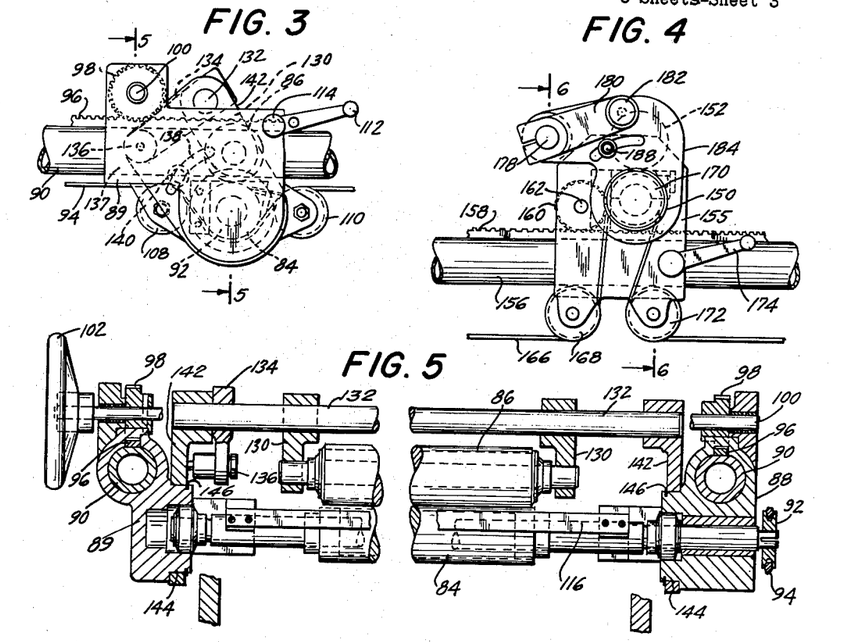
FIG. 3 is a fragmentary elevation showing the slow-down rollers for the upper deck.
FIG. 4 is a fragmentary elevation showing the slow-down rollers for the lower deck.
FIG. 5 is a transverse section, taken approximately in the plane of the line 5—5 of FIG. 3.
Figures 10, 11, 12, 13, 14:
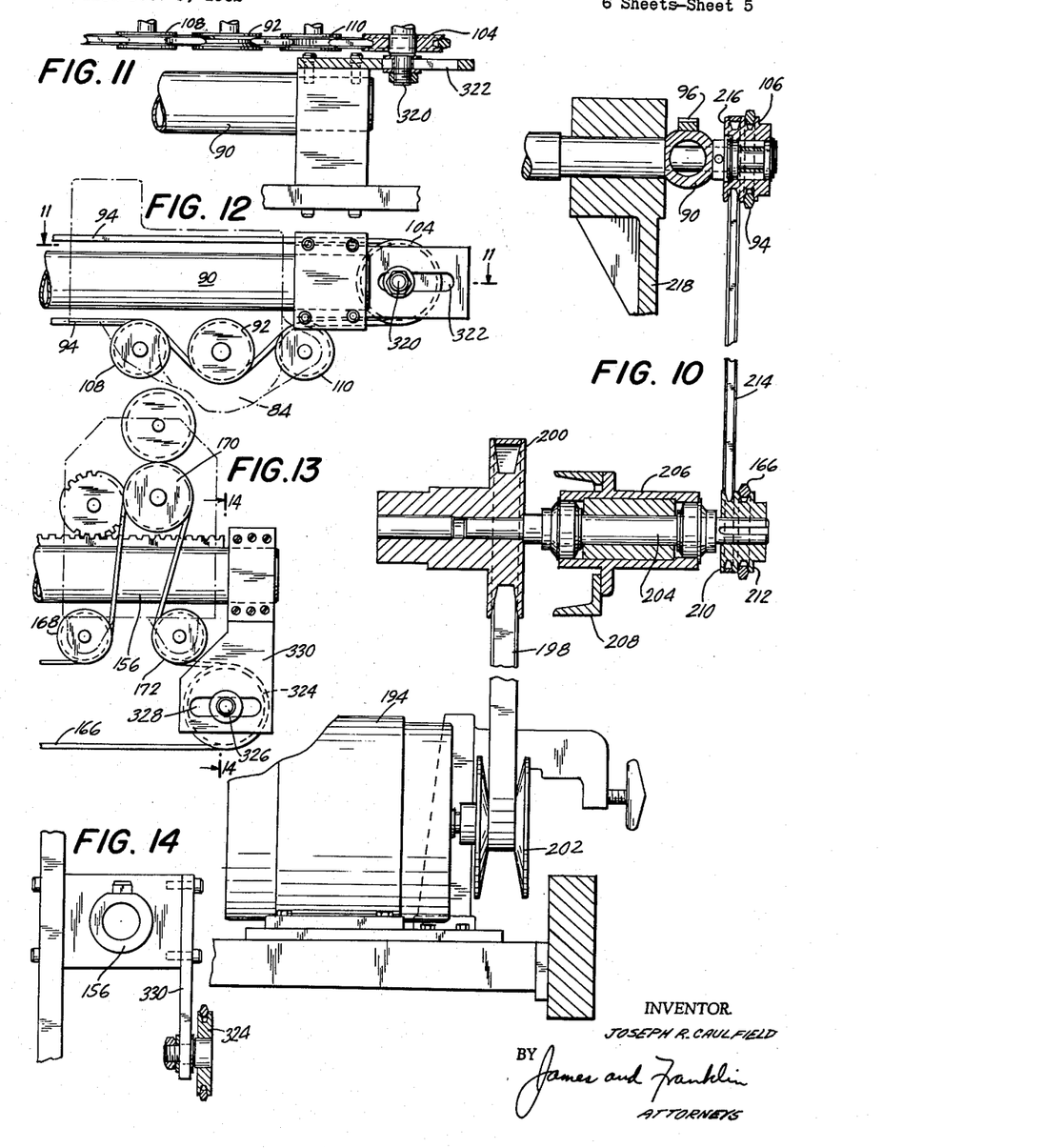
FIG. 10 is a transverse section taken approximately in the plane of the line 10—10 of FIG. 2-B, and shows the drive mechanism for the slow-down rollers.
FIG. 11 is a fragmentary section taken approximately on the stepped line 11—11 of FIG. 12.
FIG. 12 is a fragmentary elevation corresponding to a part of FIG. 3, but explanatory of the drive mechanism for the slow-down rollers of the upper deck.
FIG. 13 is a similar view, explanatory of the drive mechanism for the slow-down rollers of the lower deck.
FIG. 14 is a fragmentary section taken approximately on the line 14—14 of FIG. 13.

The slow-down rollers for the upper deck are shown in FIGS. 3 and 5 of the drawing. There is a lower driven roller 84 and an upper roller 86 which runs in frictional contact with the lower roller 84 or a blank therebetween. The shaft of the lower roller 84 is carried in bearings in cast supports 88, 89 which are movable along hollow tubular guides 90. The shaft is extended at one end to receive a drive pulley 92 engaged by an offset belt 94. This drive is also shown in FIG. 12.

Referring to FIG. 3 the tubular guides 90 carry gear racks 96 which mesh with gears 98 carried by a shaft 100 which is turned by a hand-wheel (shown at 102 in FIGS. 1 and 5, but omitted in FIG. 3). With this arrangement the roller unit or carriage may be moved bodily along the guides 90, toward or away from the deflector.

FIG. 2–B also shows how the roller carriage 88 is movable along guides 90 by rotation of gears 98, the hand-wheel being omitted. The guides 90 slope upwardly relative to the deck 28. This upward slope has two advantages. One is that it clears the way for movement of the shingling wheels 40 toward the right when dealing with very short blanks, and another is that the path of a blank guided by the deflector to the upper deck is anyway in an upward direction, and it is desirable that the blank be received by the slow-down rollers in that path.

The guides 90 are quite long, and in the present case make it possible to move the slow-down rollers some three feet, to take care of a thirty-six inch blank. The rollers are driven at the desired slow-down speed, and this drive is automatically applied in any position of the rollers along the guides 90. For this purpose I employ a belt 94 which extends between an idler pulley 104 at the right end of the guides 90, and a driven pulley 106 at the left end of guides 90. The top pass of the belt in not used, but the lower pass is deflected around the drive pulley 92 of the lower roller 84.

Referring to FIG. 3 the belt 94 extends parallel to the guide 90, except where offset around an idler 108 to drive pulley 92 and thence upwardly around another idler 110. The group of three pulleys is mounted on and travels with the carriage 88, and it will be seen that movement of the rollers along the guides is afforded without changing the length or drive of the belt. The belt may be flat, but in the present case, is a double V belt (equivalent in section to two V belts back-to-back), which has been found well suited for the present purpose.

The position of the rollers along the guides 90 is locked by a suitable locking device turned by a crank 112 pivoted at 114. This may be a screw which jams a shoe against the side of the rack 96. Two may be provided, one on each side or rack.

To insure dependable guidance of a blank to the slow-down rollers I provide an apron between the deflector and the slow-down rollers. This is preferably made of fabric so mounted as to readily accommodate adjustment of the rollers along the guides 90. Referring to FIG. 5 the metal strip 116 receives the leading edge of the fabric apron. The edge of the fabric may be turned about and secured to the strip so that the fabric moves automatically with the rollers when they are shifted along the guides.

Figures 19, 20:
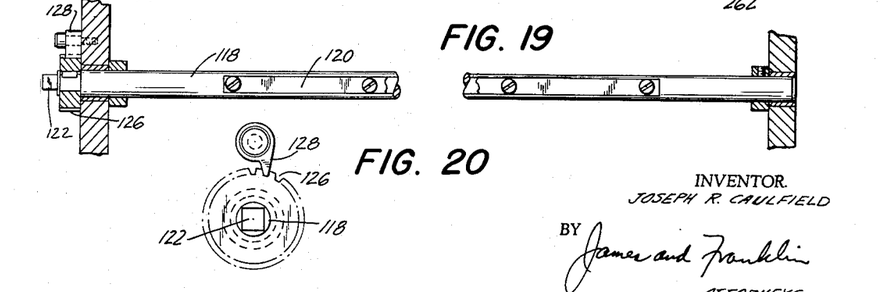
FIG. 19 shows the adjustable roller for one of the aprons.
FIG. 20 is a fragmentary elevation looking toward the left end of FIG. 19.

Referring now to FIGS. 19 and 20, the trailing edge of the fabric is secured to and is rolled up on a shaft or roller 118 by means of a strip 120. At one end the shaft 118 is squared, and the square end 122 receives a detachable crank or handwheel. The shaft also has a ratchet wheel 126 engaged by a pawl 128. The roller is located immediately behind the deflector. When the slow-down rollers are moved to the left to handle a longer blank the pawl 128 is released and some of the fabric is unrolled. When the slow-down rollers are adjusted toward the deflector to handle a shorter blank the excess length of apron is rolled on the apron roller 118. The pawl 128 permits adjustment of the apron tension to a desired amount.

Provision is made for quick release of the upper slow-down roller. Referring to FIGS. 3 and 5 the upper roller 86 is carried at its ends in arms 130 which are mounted on a quick release shaft 132. This carries an operating arm or crank 134. The shaft 132 is moved by crank 134 the end of which has a lock knob 136. By releasing the knob 136 and moving it downward the upper roller 86 is raised from the lower roller 84. The knob has an axially movable pin received in a detent hole in an end member or plate 142, described later. There are two such end members, and they carry the shaft 132, and consequently they also carry the upper roller 86.

In accordance with a further refinement of the slow-down rollers, the angle of discharge of a blank therefrom may be varied by adjusting the upper roller in an arcuate path around the lower roller. In FIG. 3 the upper roller 86 is shown directly above the lower roller 84, but it may be shifted downwardly to the left, as indicated by the arcuate slot 138, the adjustment being locked by a knob 140. For this purpose the main headers or castings 88 and 89 (FIG. 5) carry auxiliary end members 142 which have large diameter holes and are pivoted about the axis of the lower roller as indicated at 144, the parts 144 being turned to circular configuration concentric with the axis of the lower roller shaft. The parts 142 may be held assembled on the cylindrical parts 144 by means of snap rings 146. It will be evident that the blanks may be delivered at a desired downward angle by adjusting the upper roller around the lower roller.

The features so far described for the slow-down rollers of the upper deck are also employed for the lower deck, but some of the structure differs in detail.

Referring to FIGS. 4 and 6 there again is a lower driven roller 150 and an upper roller 152 which is frictionally driven by contact with the lower roller or a blank therebetween. The rollers are carried by a carriage or end castings 154, 155 (FIG. 6) and are movable along hollow tubular guides 156 carrying gear racks 158. These mesh with gears 160 carried by a shaft 162 which may be turned by a hand wheel not shown in FIG. 4, but shown at 164 in FIG. 6.

The lower roller is driven by a belt 166. The belt is turned upwardly around an idler 168 and thence around a drive pulley 170 and down to a companion idler 172. This drive is also shown in FIG. 13. With the main pass of the belt extending parallel to the guides 156, the rollers may be adjusted along the guides without affecting the length or the drive of the belt. The belt may be a flat belt, but is preferably a double V belt as in the upper deck.

The adjustment of the rollers along the guides 156 is locked by a suitable lock handle or crank 174 (FIG. 4). Two may be provided, one on each side or guide.

For quick release of the upper roller its shaft is carried in arms 176 (FIG. 6) mounted on a shaft 178 moved by a handle 180. Referring back to FIG. 4 the handle 180 may be locked in position by use of a special knob 182. This has an axially movable screw locking action, or it may be of the type in which a pin may be pulled out of or pushed into a mating detent hole in end plate 184.

Referring to FIG. 1 or to FIG. 2B the guides 156 preferably slope downward as shown. This downward slope has the same two advantages previously mentioned for the upper deck, that is, it better approximates the direction of the blanks when deflected downward to the deflector, and it clears the path for closer approach of the shingling wheels 42 when handling very short blanks.

Figure 6:
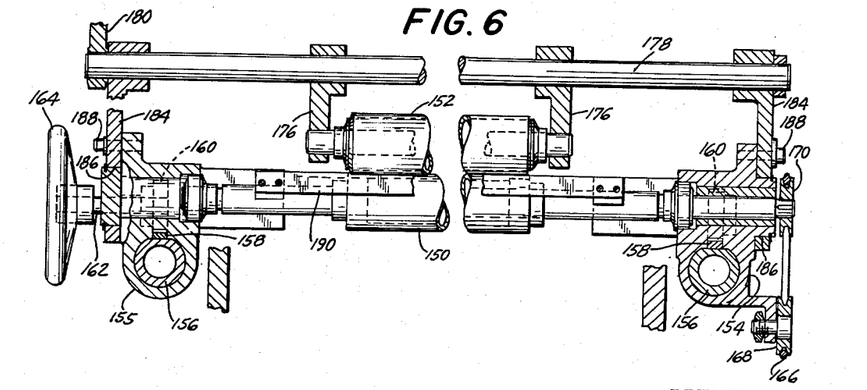
FIG. 6 is a transverse section, taken approximately in the plane of the line 6—6 of FIG. 4.

Reverting to FIGS. 4 and 6, the angle of discharge from the slow-down rollers may be varied by shifting the position of the upper roller 152. For this purpose the release shaft 178 which carries the upper roller is itself carried by auxiliary parts 184 which are oscillatable about the main headers 154 and 155. For this purpose the castings 154 and 155 have circular bearings 186 which are coaxial with the lower roller 150, and which receive the parts 184. The angular adjustment of the parts 184 may be locked by means of lock screws 188, received in arcuate slots.

As in the case of the upper deck, the lower deck has an apron to guide blanks to the slow-down rollers, and the apron is preferably fabric which is adjustable in length. FIG. 6 shows the metal strip 190 on which one end of the fabric apron is secured. The other end is secured to a roller like that shown in FIGS. 19 and 20, the said roller being located well below the deflector, as shown at 192 in FIG. 2B.

Referring to FIG. 12, the belt 94 which drives the pulley 92 of the slow-down roller 84 may be tightened by adjustment of the idle pulley 104 shown at the right of FIGS. 11 and 12, the said pulley being carried on a stub shaft 320 adjustable in a slot 322.

A similar adjustment is provided for the lower deck, and referring to FIGS. 13 and 14, the belt 166, which drives pulley 170, is carried around an idle pulley 324. This rotates on an overhung stub shaft 326 which is adjustable in a slot 328 in a fixed bracket 330, thus providing for adjustment of the belt tension. As previously mentioned, the belt is preferably a double V belt, but other belt shapes, for example a simple flat shape, could be employed.

The drive for the slow-down rollers of both decks may be described with reference to FIG. 2B. A motor 194 is mounted on the base frame 196 of the delivery apparatus, and is connected by a suitable belt 198 to a pulley 200 which turns two additional coaxial pulleys. Referring to FIG. 10, as well as FIG. 2B, motor 194 drives belt 198 through a variable speed drive pulley 202, of standard type. In the present case it is a Reeves "Flexi Speed" drive. Belt 198 drives pulley 200 which turns shaft 204, the bearing 206 of which is secured to a stationary frame member 208. The outer end of shaft 204 carries pulleys 210 and 212. Pulley 210 drives a generally upright belt 214 which drives a pulley 216 secured to or integral with the pulley 106 previously referred to as driving belt 94 of the upper deck. Belt 94 extends parallel to the upper guide 90. The drawing also shows the stationary upright strut 218 which supports the upper guides 90.

FIGS. 2B and 10 also show how pulley 212 is driven by or is integral with pulley 210, and serves to drive the double V belt 166 previously referred to, and which extends parallel to the lower guide 156.

*Shingling wheels*

Referring to FIG. 1 it will be seen that there are a considerable number of relatively narrow shingling wheels 40 and 42 distributed across the machine from side-to-side and resting on the slow belts. A single wide belt might be employed as a slow belt, but it is found to be more convenient to employ a considerable number of narrow belts. In the present case the belts have a width of about six inches with a space between belts of about one-half inch. The number of belts depends on the width of the machine.

Referring now to FIG. 2A, each shingling wheel 40 is mounted on an individual support arm 220 which is itself pivoted at 222. The effective length of arm 220 may be varied, as indicated by the slot 224, and the wheels are all carried by a carriage 226 which is movable along the deck, as by means of a gear rack 228.

Figure 15:
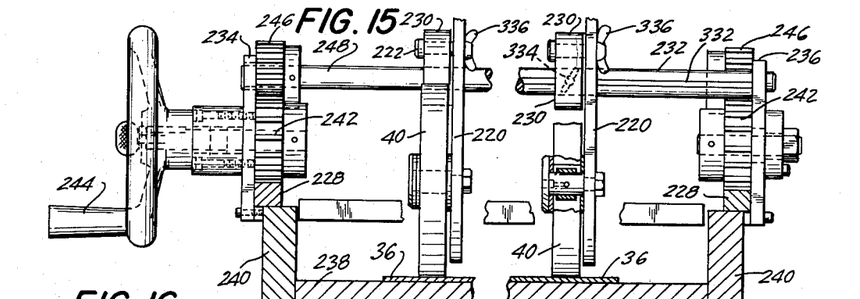
FIG. 15 is a transverse section taken at the shingling wheels, looking toward the right end of FIG. 2–A at either the upper or the lower deck.

Referring now to FIG. 15 of the drawing, the shingling wheel 40 and arm 220 are pivotally secured at 222 to an upright block 230 which is secured on a shaft 232 which extends between end bearing plates 234 and 236. Only the right end of shaft 232 is shown. The shingling wheels 40 rest on slow belts 36 which in turn may be supported on and slide over a board 238. This board extends between deck members 240 which carry the gear racks 228. These are engaged by gears 242 which are turned by a handle 244. In the present case it is preferred not to extend the shaft of gears 242 directly across the machine. Instead, the gears 242 mesh with gears 246 which have a common shaft 248 extending across the machine at a level considerably higher than the axis of gears 242, and thereby maintaining a much greater clearance height through the machine above the deck. Only the left end of shaft 248 is shown in FIG. 15.

The gear racks 228 extend for substantially the entire length of the deck, and the shingling wheels therefore may be moved all the way to the right or left, depending on the blank length. It will be understood that just as a blank should be free of the high speed tab breaker rolls 26, 60 before reaching the slow-down rollers, so also a blank should be free of the slow-down rollers before reaching the shingling wheels. However, excess length is not wanted, and therefore with a short blank the gear racks are employed to move the carriage toward the right, and conversely for a long blank the carriage is moved toward the left, the movement of the shingling carriage being approximately double the movement of the roller carriage. The carriage position along the deck is locked by appropriate clamp or lock means, acting on the rack or the gearing, as preferred. As here shown in FIG. 2A there are wing screws 227 which engage the rack.

Referring to FIG. 15, the blocks 230 are splined or keyed on shaft 232, as shown at 332, so that they cannot turn about the shaft, and instead remain upright, the shaft itself being non-rotatable. However, the blocks 230 are slidable along the shaft so that the location of the shingling wheels may be adjusted relative to the particular blanks being handled. For this purpose each block 230 has a set screw 334, which may be a wing screw with a large flat head. The arms 220 which carry the shingling wheels are slotted for most of their length to permit independent adjustment of the shingling wheels toward or away from the slow-down rollers, and the individual adjustment may be fixed by tightening a large wing nut, indicated at 336. The purpose of this adjustment is to take care of the leading edge of a carton blank which may be irregular. The wheels may be appropriately adjusted at points where the carton blank is cut back, so that all of the wheels come into action simultaneously.

The shingling wheels for the lower deck, and the carriage for the same, are like those previously described for the upper deck. It will be understood that in most figures of the drawing the hand wheels have been omitted, but they are shown in FIGS. 1, 5, 6 and 15.

The slow belts

Reference has already been made to the slow belts 36 and 38 in FIG. 1 for the upper and lower decks respectively. The discharge ends of these belts are also shown in FIG. 2A, the belt 36 turning about an idler roller 250. The lower deck belts 38 pass over a support roller 253 and around an idler roller 254, the position of which is yieldable, for a reason explained later. It is urged to the left by compression springs 255, adjusted by screws 256, to tighten the belts. The bearings are slidably guided in ways 257. It is not essential for the upper end roller 250 to be yieldable, but similar slidable bearings and springs may be employed, adjusted by screws 252. The belts are preferably supported by suitable underlying boards or deck surfaces, one part of which is indicated at 258.

Referring now to FIG. 2B, the upper slow belts 36 are driven by a drum at 260. This in turn carries a pulley or sprocket wheel 262 driven by a belt or roller chain 264 and a pulley or sprocket wheel 266. The latter may be secured to a pulley or sprocket wheel driven by a belt or roller chain 268. The use of sprockets and roller chains is preferred. Chain 268 is driven by a sprocket wheel centered at 270. This is driven by a chain 272 which in turn is driven by a motor 274 (FIG. 2A) through a variable speed drive pulley 276, the motor position being shifted by a crank 278. A gear box 280 is preferably disposed in the drive system because of the great speed reduction wanted in order that the slow belts be moved at only a crawl speed.

The slow belts of the lower deck are driven by the same motor, the power being taken off at the shaft 270 (FIG. 2B) previously referred to. For this purpose a belt drive drum is disposed on the axis 270, and the slow belts are brought to the drum. More specifically, the top pass of the belt runs along the deck as would be expected. From the yieldable idler 254 (FIG. 2A) at the discharge end the slow belts run back to an idler drum 282 (FIG. 2B) and thence reversely around the power drive drum 284, and thence upwardly as shown at 38′, to an idler drum 286 at the input end of the deck.

Tilt adjustment of decks

Figure 16:
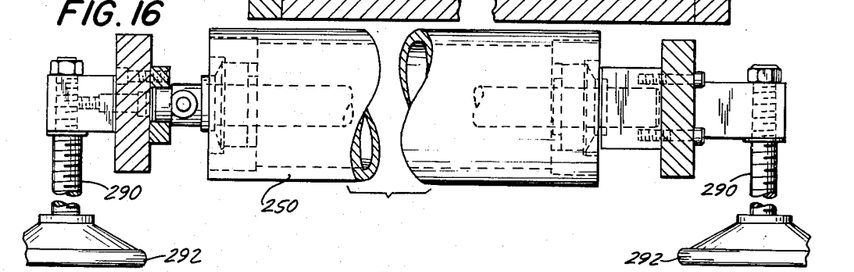
FIG. 16 is a view taken approximately in the plane of the line 16—16 of FIG. 2–A.
Figure 17:
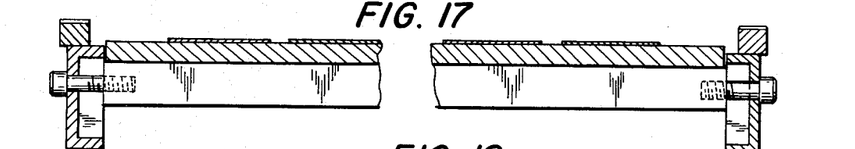
FIG. 17 is a vertical scetion taken along one of the decks, typically at the line 17—17 in FIG. 2–B.

Referring to FIGS. 1 and 2A, the upper deck 28 is pivoted at its input end, and may be raised or lowered at its discharge end. More specifically, the left end may be raised or lowered by operating a screw 290 by means of a hand wheel 292. These parts are also shown in FIG. 16, the screws 290 being turned by hand wheels 292 to raise or lower the upper deck at the idle drum 250 of the slow speed belts. If desired, the upright screws may be geared together for rotation in unison.

Figure 18:
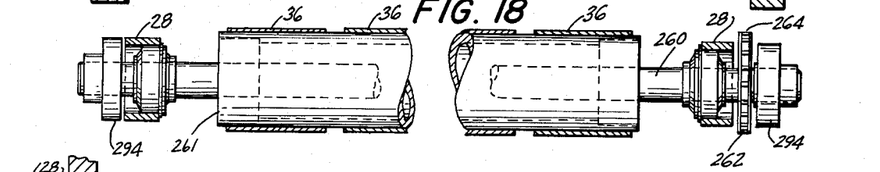
FIG. 18 is a section through the drive roller for the slow belts, and is taken on the line 18—18 of FIG. 2–B.

Referring now to FIG. 2-B, the upper deck 28 is tilted about the axis 260 of the drive drum for the slow speed belts. By pivoting the deck at this point the tilting operation in no way affects the drive of the belts nor of the drive chains leading to the driving drum of the belts. FIG. 18 shows the driving drum 261 with slow speed belts 36 and shaft 260 carrying sprocket wheel 262 and roller chain 264. The side elements of the deck are shown at 28, and the parts are all carried by fixed brackets 294 which are also shown in FIG. 2B, and which project from upright frame members 296 (FIG. 2B) carried by the base frame 196, with additional support by the brace member 208.

The tilt of the lower deck is also adjustable. Referring to FIG. 1, this is done by means of a handwheel 300, which raises or lowers the right end of the deck 30 about the shaft 251. Referring next to FIG. 2B, the hand wheel 300 turns a shaft 302 which, through mitre gears 304, turns two upright screws 306, which are pivotally connected at their upper ends to the right end of the deck 30. This raises or lowers the right end, the deck tilting about the shaft 251 (FIG. 2A) of the roller 253. The left end of deck 30 is bifurcated to straddle the shaft 251. This permits a slight horizontal movement of the deck 30 caused by the vertical screws 306 (FIG. 2B) being straight instead of arcuate.

The tilt adjustment causes a change in the slow belts, and this is compensated by the compression springs 255 (FIG. 2A) and slidable bearings of roller 254.

One reason for the tilt adjustment of the upper deck and of the lower deck is to help adjust the delivery for different size blanks and also differences in material, which may affect the angle of delivery and the rapidity with which the blanks settle as they reach the shingling wheels. The objective is to insure smooth dependable shingling. Another and entirely different reason for tilt adjustment of the upper deck concerns the handling of blanks of abnormal length. In the present case blanks up to eighteen inches are handled on both decks. However, if blanks are still longer, and all the way up to thirty-six inches, they may be handled, but not by division as between the two decks. Instead they are all fed to the upper deck, and the guides 90 for the slow-down rollers of the upper deck are made extra long for this purpose. In such case the upper table 44 is removed and the left end of the upper deck is lowered.

The blanks are then fed from the slow-down belts 36 of the upper deck to the slow-down belts 38 of the lower deck and then to the lower table 46. In such case, as a further refinement, the slow-down belts may themselves differ in speed, the lower belts being run slower than the upper belts so that the blanks are shingled more closely on the lower belts, before being stacked vertically on the lower table.

The linkage of the deflector is disconnected when all blanks are fed to the upper deck. The blanks are shingled on the upper deck with a spacing of say one-half inch, and are more closely shingled on the lower deck by operating the slow speed belts of the lower deck at a reduced rate, the spacing then being substantially less, say one-eighth inch. For this purpose a variable speed unit is introduced between the lower and upper belt drives, or two separate belts or chains may be used in lieu of the part 272 in FIG. 1A, one for the upper deck and the other for the lower deck.

Miscellaneous

The slow-speed belts may be advanced abruptly at intervals, say every hundred carton blanks, to separate one counted batch from the next. Referring to FIG. 2B, this is accomplished by means of an actuating cylinder 350 which is connected to the arm 352 of a ratchet device or overrunning clutch on the shaft 270. The actuator is controlled by a counter, and abruptly advances the shaft 270, and consequently the slow belts, by a desired amount, say an inch or two, thereby marking the end of one batch and the beginning of the next batch of blanks as they are delivered from the slow belts to the table. This guides an operator in removing counted batches from the tables.

The entire delivery is preferably mounted on wheels so that it may be pulled away from the stripper for servicing the latter. Referring to FIGS. 2A and 2B, the bottom frame 196 of the delivery is mounted on wheels 310 which permit the entire structure to be pulled bodily away from the adjacent units.

The base frame 196 has upright pedestals 312 which carry the shaft 270. It also has uprights 314 which are offset and continued upward at 296, where they act as frame members for carrying the tab breaker rollers 26, 60 and the deflector 50, as well as the rollers of the aprons. The frame portions 296 have forwardly extending arms 294 which pivotally carry the upper deck 28 at the shaft 260. The side frame members 296 also carry one end of the upwardly sloping guides 90 for the upper slow-down rollers, and the downwardly sloping guides 156 for the lower slow-down rollers. The stationary upright frame member 218 which supports the guides 90 is used here on one side only of the machine, preferably the side with the drive belts 94, 166 and 214, thereby leaving the other side of the machine free and open for adjustment of the slow-down rollers and the shingling wheels. The open or accessible side of the machine has the various hand wheels, best shown in FIG. 1 of the drawing.

It is believed that the construction and operation, as well as the advantages of my new double deck delivery, will be apparent from the foregoing detailed description. It will also be apparent that while I have shown and described the invention in a preferred form, changes may be made without departing from the scope of the invention, as sought to be defined in the following claims.

I claim:

1. A double deck delivery apparatus including an oscillatable deflector, means so driving the same as to deflect alternate blanks to an upper deck and intermediate blanks to a lower deck, said decks comprising upper and lower slow-down rollers, means movably mounting the same for adjustment toward or away from the deflector, means to drive the slow-down rollers in any position of such adjustment along the deck, and aprons between the deflector and the slow-down rollers, said aprons being flexible and having one end secured for movement with the slow-down rollers when adjusted toward or away from the deflector, the other end of each apron being wound on a roller so that the apron is adjustable in length.

2. A double deck delivery apparatus including an oscillatable deflector, means so driving the same as to deflect alternate blanks to an upper deck and intermediate blanks to a lower deck, said decks comprising upper and lower slow-down rollers, means movably mounting the same for adjustment toward or away from the deflector, means to drive the slow-down rollers in any position of such adjustment along the deck, slow belts extending along said decks, shingling wheels over the slow belts, means movably mounting the same for adjustment of their position toward or away from the slow-down rollers, and aprons between the deflector and the slow-down rollers, said aprons being flexible and having one end secured for movement with the slow-down rollers when adjusted toward or away from the deflector, the other end of each apron being wound on a roller so that the apron is adjustable in length.

3. A double deck delivery apparatus including an oscillatable deflector, means so driving the same as to deflect alternate blanks to an upper deck and intermediate blanks to a lower deck, said decks comprising upper and lower slow-down rollers, means movably mounting the same for adjustment toward or away from the deflector, means to drive the slow-down rollers in any position of such adjustment along the deck, slow belts extending along said decks, shingling wheels over the slow belts, means movably mounting the same for adjustment of their position toward or away from the slow-down rollers, the upper slow-down rollers being mounted for angular adjustment around the lower slow-down rollers in order to change the angle of delivery of blanks from the slow-down rollers toward the shingling wheels, tables at the ends of the slow belts to receive the superposed blanks, and aprons between the deflector and the slow-down rollers, said aprons being flexible and having one end secured for movement with the slow-down rollers when adjusted toward or away from the deflector, the other end of each apron being wound on a roller so that the apron is adjustable in length.

4. A double deck delivery apparatus including an oscillatable deflector, means so driving the same as to deflect alternate blanks to an upper deck and intermediate blanks to a lower deck, said decks comprising upper and lower slow-down rollers, means movably mounting the same for adjustment toward or away from the deflector, means to drive the slow-down rollers in any position of such adjustment along the deck, slow belts extending along said decks, shingling wheels over the slow belts, means movably mounting the same for adjustment toward or away from the slow-down rollers, means to bodily adjust the angle of each deck, means to drive the slow belts regardless of such angular adjustment, and tables at the ends of the slow belts to receive the superposed blanks, the slow belts of the lower deck being longer than those of the upper deck whereby the table of the lower deck is beyond the table of the upper deck, and aprons between the deflector and the slow-down rollers, said aprons being flexible and having one end secured for movement with the slow-down rollers when adjusted toward or away from the deflector, the other end of each apron being wound on a roller so that the apron is adjustable in length.

5. A double deck delivery apparatus including an oscillatable deflector, means so driving the same as to deflect alternate blanks to an upper deck and intermediate blanks to a lower deck, said decks comprising upper and lower slow-down rollers, means movably mounting the same for adjustment toward or away from the deflector, means to drive the slow-down rollers in any position of such adjustment along the deck, slow belts extending along said decks, shingling wheels over the slow belts, means movably mounting the same for adjustment toward or away from the slow-down rollers, the upper slow-down rollers being mounted for angular adjustment around the lower slow-down rollers in order to change the angle of delivery of blanks from the slow-down rollers toward the shingling wheels, means to bodily adjust the angle of each deck, means to drive the slow belts regardless of such angular adjustment, tables at the ends of the slow belts to receive the superposed blanks, the slow belts of the lower deck being longer than those of the upper deck whereby the table of the lower deck is beyond the table of the upper deck, and aprons between the deflector and the slow-down rollers, said aprons being flexible and having one end secured for movement with the slow-down rollers when adjusted toward or away from the deflector, the other end of each apron being wound on a roller so that the apron is adjustable in length.

6. A delivery apparatus comprising a deck, upper and lower slow-down rollers, means movably mounting the same for adjustment along the deck toward or away from the entrant end of the deck, means to drive the slow-down rollers in any position of such adjustment along the deck, a flexible apron having one end secured for movement with the slow-down rollers when adjusted along the deck, the other end of the apron being wound on a roller at the entrant end of the deck so that the apron is adjustable in length, and slow belts extending along the deck.

References Cited by the Examiner
UNITED STATES PATENTS

| | | | |
|---|---|---|---|
| 1,879,040 | 9/32 | Belluche | 271—87 |
| 2,497,149 | 2/50 | Berdis et al. | 271—64 X |
| 2,563,492 | 8/51 | Turrall et al. | 271—64 |
| 2,772,880 | 12/56 | Garrett | 271—68 X |
| 2,815,949 | 12/57 | Faeber | 271—64 |

SAMUEL F. COLEMAN, *Acting Primary Examiner.*

RAPHAEL M. LUPO, *Examiner.*